United States Patent [19]
Dunn

[11] Patent Number: 5,381,279
[45] Date of Patent: Jan. 10, 1995

[54] DISK DRIVE SYSTEM WITH ADJUSTABLE SPINDLE AND ACTUATOR POWER TO IMPROVE SEEK AND ACCESS PERFORMANCE

[75] Inventor: Paul F. Dunn, Longmont, Colo.

[73] Assignee: Maxtor Corporation, San Jose, Calif.

[21] Appl. No.: 135,071

[22] Filed: Oct. 13, 1993

[51] Int. Cl.⁶ .................. G11B 21/04; G11B 15/46; G11B 21/02; G11B 5/596
[52] U.S. Cl. .................. 360/70; 360/73.03; 360/75; 360/78.04
[58] Field of Search .............. 360/73.03, 75, 78.04, 360/69, 70, 71, 73.01, 77.01, 77.02, 78.01, 137, 77.05, 77.08, 78.06, 78.07, 78.09; 318/39, 49, 50, 51, 561; 369/32

[56] References Cited

U.S. PATENT DOCUMENTS

| | | | |
|---|---|---|---|
| 4,103,314 | 7/1978 | Case | 360/78.06 |
| 4,149,200 | 4/1979 | Card | 360/77.08 |
| 4,333,117 | 6/1982 | Johnson | 360/78.07 |
| 4,439,800 | 3/1984 | Powell | 360/78.07 |
| 4,535,372 | 8/1985 | Yeakley | 360/77.05 |
| 4,924,160 | 5/1990 | Tung | 318/561 |
| 5,005,089 | 4/1991 | Thanos et al. | 360/77.08 |
| 5,050,146 | 9/1991 | Richgels et al. | 369/32 |
| 5,128,813 | 7/1992 | Lee | 360/78.07 |
| 5,182,684 | 1/1993 | Thomas et al. | 360/78.09 |

*Primary Examiner*—Donald Hajec
*Assistant Examiner*—Patrick Wamsley
*Attorney, Agent, or Firm*—Blakely, Sokoloff, Taylor & Zafman

[57] ABSTRACT

In the disk drive system of the present invention, the peak power drain on the power supply is maintained within acceptable levels while improving the seek performance of the actuator. This is achieved by timely decreasing the current to the spindle motor during at least a portion of the accelerate and decelerate portions of the seek, to provide the additional current necessary to accelerate faster and therefore improve the seek time performance. The current taken away from the spindle motor during those times is returned to the spindle motor during the coast portion of the seek in order that spindle velocity within tolerances is maintained by the end of the seek when a read/write operation occurs. Thus, the seek performance is improved and the peak power as seen at the power supply is maintained constant or reduced.

22 Claims, 5 Drawing Sheets

DISK DRIVE SYSTEM WITH ADJUSTABLE SPINDLE AND ACTUATOR POWER TO IMPROVE SEEK AND ACCESS PERFORMANCE

BACKGROUND OF THE INVENTION

1. Field of the Invention

The present invention relates to a disk drive system in which the actuator seek time access is improved. More particularly, the present invention relates to a disk drive system in which the seek time access is decreased while utilizing the same power supply for powering the movement of the actuator.

2. Art Background

Disk drives are popular media for storing data in machine readable form. There is an ever-present desire to decrease the average time required to access any desired data on the disk ("the seek time") while maintaining reasonable costs for performing the access.

A simplified block diagram of a disk drive system is shown in FIG. 1. The disk 10 rotates about a spindle 15, driven by a spindle motor 20, as controlled by the spindle motor control 25. The speed of revolution of the disk is therefore controlled by the spindle motor 20 and control 25 system. The head assembly 30 is attached to an actuator 35, controlled by an actuator motor 40 and actuator control 45, to move the actuator 35 and therefore the head assembly 30, to access different tracks of the disk 10.

Disk drive interface controller 50 controls the overall operation of the disk drive system and the exchange of data between the disk drive and the host device such as a computer system or CPU. Read/write control 55 controls the read and write operations on the disk by the head assembly 30. Power supply 60 provides the necessary power to drive the disk drive system, including spindle motor 20 and actuator motor 40.

Typically, in a disk drive system, the current to the actuator motor is controlled in one of two ways: voltage mode or current mode. In a voltage mode, seeks a voltage at or near the full voltage available at the power supply is provided to the actuator motor in both the accelerate and decelerate portions of the seek in order to reach a specified track on the disk drive. If the distance the actuator is to move to the next location is great, resulting in a long seek, the actuator may go into a constant velocity or coast state. The coast state typically corresponds to the maximum velocity the actuator can physically move while maintaining control of actuator movement. Thus, the seek consists of, in general, an accelerate portion, a coast portion at a constant velocity and a deceleration portion, resulting in the movement of the head assembly to a track on which a read or write operation is to be performed. An exemplary voltage mode current profile for the actuator is shown in FIG. 2a. During both the accelerate and decelerate phases of the seek, the maximum voltage is put across the actuator motor, thus producing the maximum current. The slope on the current profile is due to motor back EMF.

Although a voltage mode seek enables the fastest possible seek time, the hardware and software cost needed to implement the portions of the seek, for example, the deceleration trajectory following is significant as a deceleration profile must be continuously calculated according to the current input to the motor. In particular, the way an actuator moves to the proper track during a seek is to try to follow a velocity versus position schedule that is created with the knowledge of what the deceleration of the actuator is. Since a voltage mode seek puts all of the available voltage across the actuator, and the voltage supply will vary with many factors (time, the system the drive is installed in, etc.) the only way to know the deceleration attainable by a drive would be to monitor the supply voltage. Furthermore, exact torque of the actuator, inertia, external forces (flex lead bias, windage, etc.) would also have to be known. After all of these parameters were identified, the velocity versus position schedule is created using the equation velocity =square_root (2*deceleration*position).

There are a number of practical problems with the implementation. One problem is that all of the parameters that affect deceleration cannot be exactly identified. The other problem is that calculating the square root function with the processors used in disk drives is not feasible as the processors are not powerful enough to timely perform the calculations. Furthermore, the peak current drawn during the deceleration portion of the seek is significantly more than the average value. This is a result of the back EMF of the actuator effectively adding to the supply voltage so that more current is drawn from the power supply. Conversely, during the accelerate portion of the seek, the back EMF is subtracting from the supply voltage, thereby causing the current to become lower as the actuator moves faster. Back EMF (ElectroMotive Force) is a property of voice coil actuators in which a voltage will be produced in the motor that is proportionate to the velocity of the motor. During the acceleration this voltage reduces the available voltage and current as the actuator velocity increases, and during the deceleration it adds to the voltage across the motor thus increasing the current available. In some systems, derating by this extra voltage provided more margin in the design. In the push for faster seek times, some systems use this extra voltage in both the accelerate and the decelerate portions of the seek. This means that the velocity versus position scheduler is now made assuming the deceleration will change with the velocity of the actuator. Although this gives the system the ability to decelerate faster and thus improve seek times, the peak current drawn increases.

Therefore, in summary, the voltage mode is an idealized solution utilizing full acceleration and deceleration. The drawback is that actuator response varies from actuator to actuator, for example, having different torques. Furthermore, different power supplies may provide different responses.

The second method used to move the actuator is a current mode seek. In a current mode seek, the minimum current that can be put into the actuator is calculated for both the accelerate and decelerate portions of the seek and these values are used throughout the seek.

Typically, these values are calculated in accordance with an estimate of the performance of a worst case actuator (e.g., an actuator with the lowest torque), thereby insuring that all actuators be able to follow the worst case acceleration/deceleration schedule. Therefore, each actuator configured to operate using current mode seek operates in the worst case scenario, decreasing the potential performance of those actuators which do not operate in accordance with the worst case. Furthermore, the current mode is slow, as a minimum value is input to drive the actuator during the accelerate and decelerate portions, resulting in a longer seek time.

In practice, it has been found that the current mode is easier to implement and the peak current used, and therefore the drain on the power supply, is less. FIG. 2b is an illustration of the current mode current profile for an actuator. During the accelerate portion of a seek, a constant current value is provided to the actuator. Similarly, during the decelerate portion, a constant current input is provided to drive the actuator.

As mentioned earlier, the spindle motor drives the spindle and therefore the revolution of the disk. The spindle motor also utilizes the power supply. FIG. 2c is an illustration of the current profile for the current driving the spindle motor. The spindle motor is considered independent from the actuator motor. The spindle motor current is held preferably at a time average value such that the motor maintains a velocity within a necessary tolerance.

SUMMARY OF THE INVENTION

It is therefore an object of the present invention to provide a disk drive system in which the seek performance is improved while maintaining constant power utilization.

In the disk drive system of the present invention, the instantaneous power drain on the power supply is maintained constant while improving the seek performance of the actuator. This is achieved by timely decreasing the current to the spindle motor during the accelerate and decelerate portions of the seek, to provide the additional current necessary to accelerate faster and therefore improve the seek time performance. The current taken away from the spindle motor during those times is returned to the spindle motor during the coast portion of the seek in order that spindle velocity within tolerances is maintained by the end of the seek when a read/write operation occurs. Thus, the seek performance is improved and the peak power as seen at the power supply is maintained constant or reduced.

Therefore, the present invention takes advantage of spindle velocity tolerances to improve the seek performance of the actuator while maintaining or minimizing overall power consumption of the disk drive.

BRIEF DESCRIPTION OF THE DRAWINGS

The objects, features and advantages the present invention will be apparent to one skilled in the art from the following detailed description in which.

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagrams form in order not to obscure the present invention unnecessarily.

In the system of the present invention, seek performance is improved without affecting overall peak power consumption of the disk drive. Therefore, not only is the seek performance improved, but the cost of constructing the disk drive system is minimized by eliminating the need to provide a more powerful, and therefore more costly, power supply.

To improve the seek performance, the additional current in the actuator is increased during the accelerate and/or decelerate portions of the seek. In order to eliminate the need for a more powerful power supply, the additional current needed during the accelerate and/or decelerate portions of the seek is drawn from that typically consumed by the spindle motor by temporarily decreasing the current drawn by the spindle motor. The spindle motor current is typically considered independent from the current in the actuator. The spindle motor current is held at a time average value such that the motor maintains a velocity within a determined tolerance. Thus, when current is decreased to the spindle motor in order to increase current to the actuator, a velocity change in spindle rotation will be noted. To compensate for the decreased current, the current is increased to the spindle motor during the corresponding coast phase of the actuator seek by an equal amount. This functions to increase the velocity of the spindle, resulting in a zero net velocity change at the spindle by the end of the seek.

Thus, in a system using current mode seeks, the accelerate and/or decelerate portions of the seek can obtain performance approaching that of a voltage mode seek. At the same time, the peak power as seen at the power supply can be reduced relative to the voltage mode seek. In a system using a voltage mode seek, this method reduces the peak power as seen at the power supply.

Figure 1:
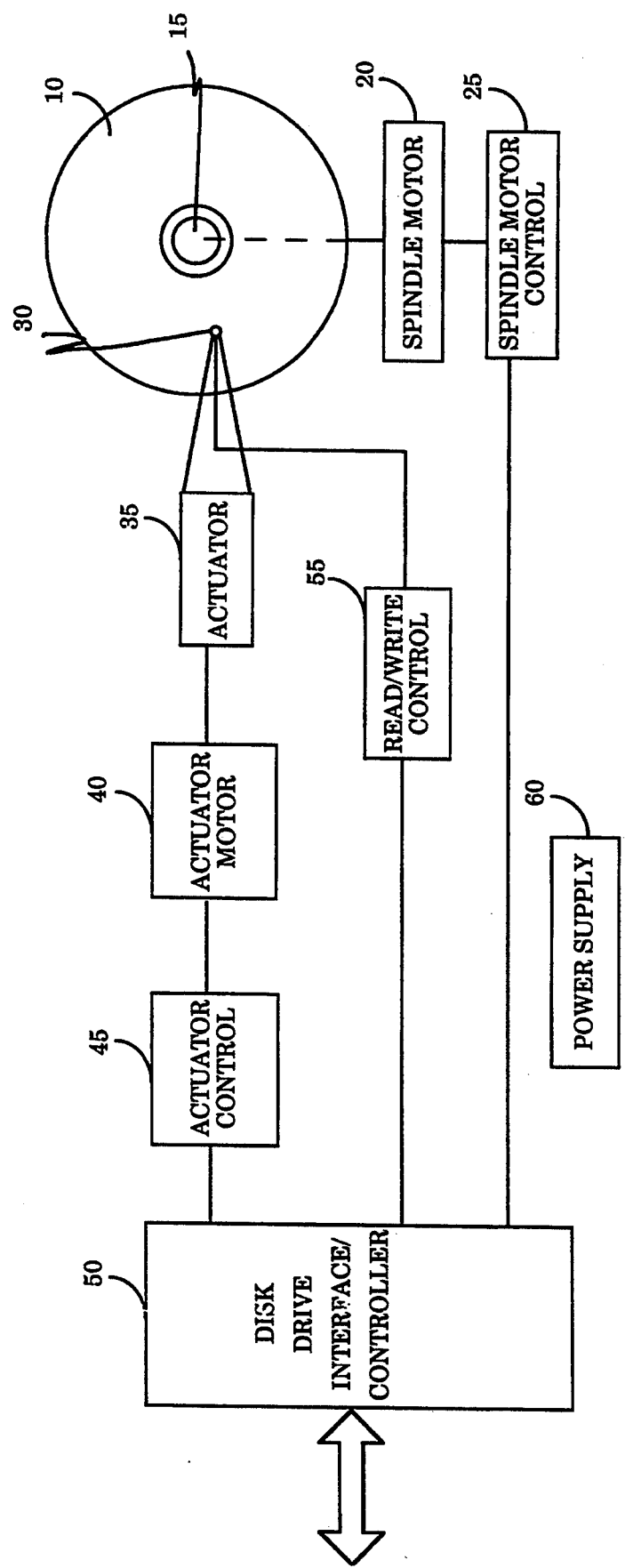
FIG. 1 is a prior art block diagram of disk drive system.
Figure 2A:
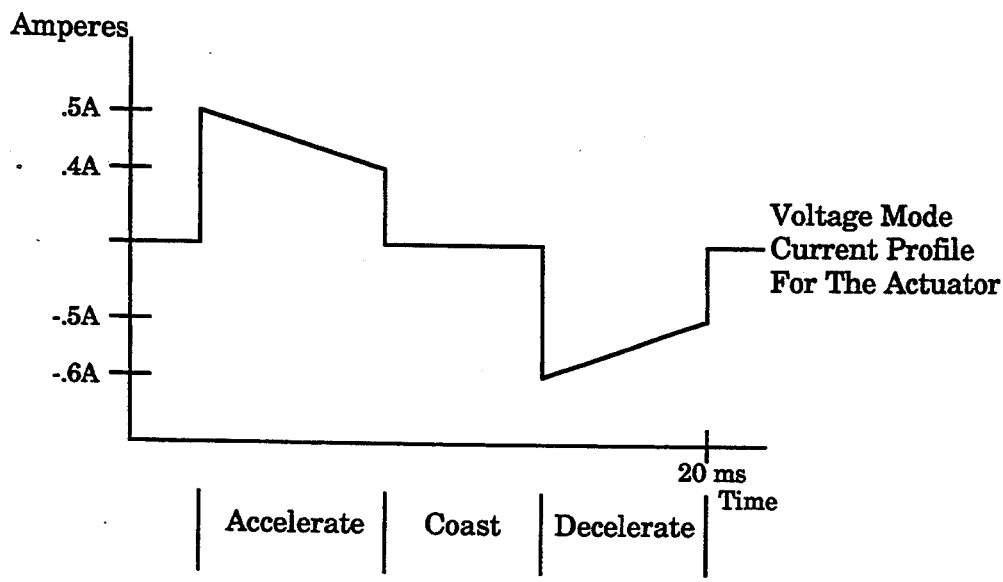
FIG. 2a is a prior art voltage mode current profile for the actuator.
Figure 2B:
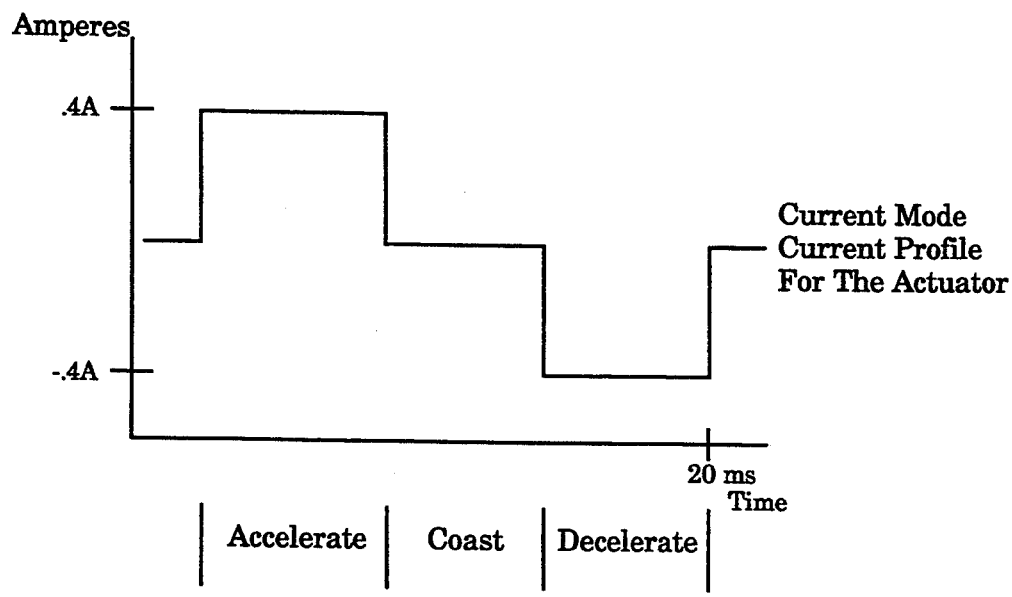
FIG. 2b is a prior art current mode current profile for the actuator.
Figure 2C:
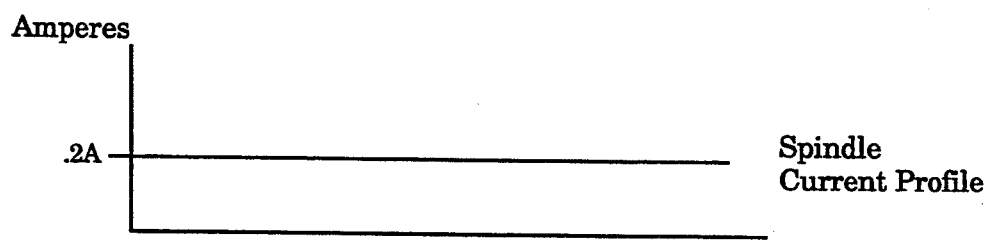
FIG. 2c is a prior art current profile for the spindle.
Figure 3A:
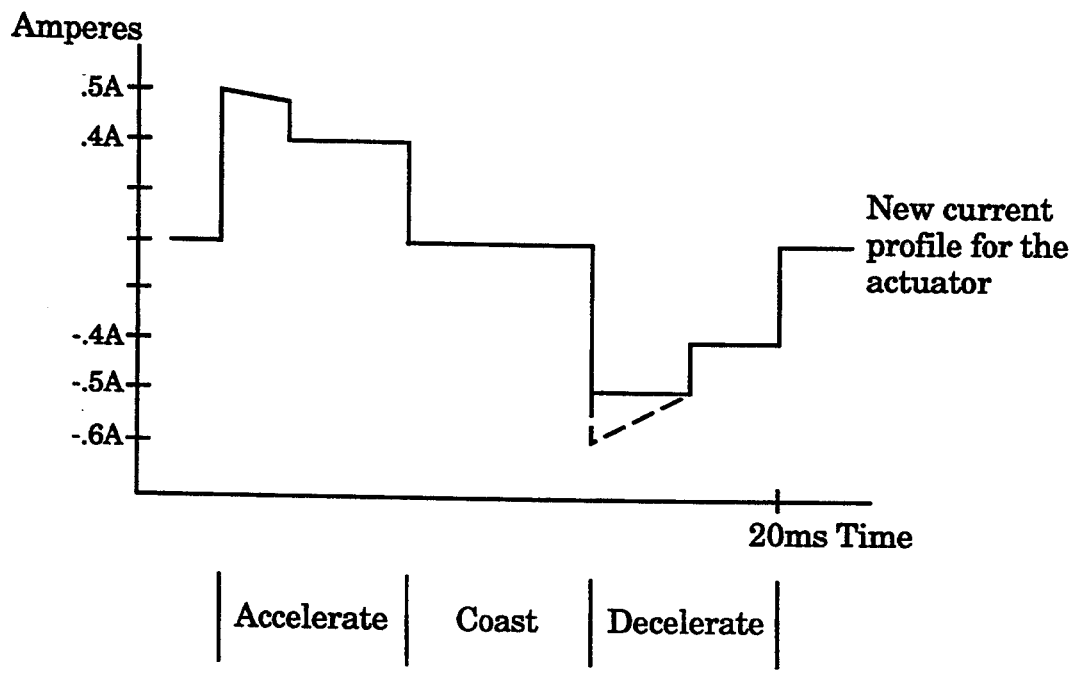
FIG. 3a is illustrates a current profile for the actuator in accordance with the teachings of the present invention.
Figure 3B:
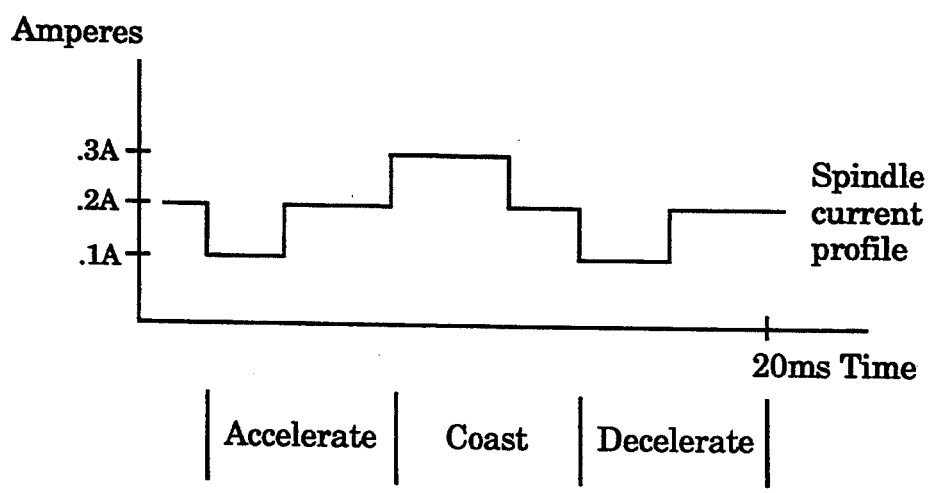
FIG. 3b is illustrates a spindle current profile in accordance with the teachings of the present invention.

Illustrative actuator current profiles are shown in FIG. 3a and FIG. 3b. FIG. 3a illustrates a current profile for the actuator. As additional current is available to be supplied to the actuator, the acceleration is initially driven to a peak value until the maximum velocity is reached.

Referring to FIG. 3b, the spindle current profile shown shows a dip in the current supply corresponding to the increase in current supply to the actuator. During the coast portion of the seek by the actuator, the current to the spindle is increased by an amount equal to that of the decreased amount during the accelerate phase and the subsequent decrease in amount during the decelerate phase. The amount in duration of the current taken away from the spindle is chosen such that the spindle velocity is not slowed down to such a point that recovery of velocity during the coast phase is not possible. Furthermore, the spindle speed is not critical during seek time but during read and write processing. Therefore, the velocity can be decreased somewhat during seek, so long as it is subsequently increased to the intended velocity during a read and write process.

In the present example illustrated by FIGS. 3a and 3b, the current in the current mode seek has been limited to the minimum value attainable in both the acceleration phase and the deceleration phase as previously explained. Also the current in the decelerate portion of the current mode seek has been derated 20% to allow for velocity corrections during the decelerate portion of the seek. This is done so that corrections can be made to help follow the velocity versus position schedule. Since the parameters of the system are not known exactly, these corrections are necessary. In the present example, the current values are 0.4 Amperes for the accelerate portion and −0.4 Amperes for the decelerate portion of the seek. Thus from FIG. 3a, although the actuator can take an additional 0.1 Amperes and the current mode actuator current increased 0.1 Amperes, the net current from the power supply never exceeds ±0.6 Amperes. The spindle current is increased by 0.1 Amperes during the accelerate and decelerate portions of the seek. The maximum current seen at the power supply with this technique is the same maximum current seen by the supply if the current in the spindle is not changed relative to the actuator and a current mode seek is used, but this method provides for an improved seek time.

It should be noted that the accelerate portion of the seek is not as parameter sensitive as the decelerate portion, since any errors produced will be reduced or eliminated during the decelerate portion of the seek. In one embodiment, a current mode acceleration is derated similar to the deceleration. This has the effect that some drives will not seek as fast as they could, but all drives should have almost exactly the same seek time for a given seek distance since both the decelerate and the accelerate portions are derated to allow the worst case drive to meet the commanded acceleration or deceleration. Alternately, acceleration is done in the voltage mode to allow the drives that can seek faster to do so.

Figure 4:
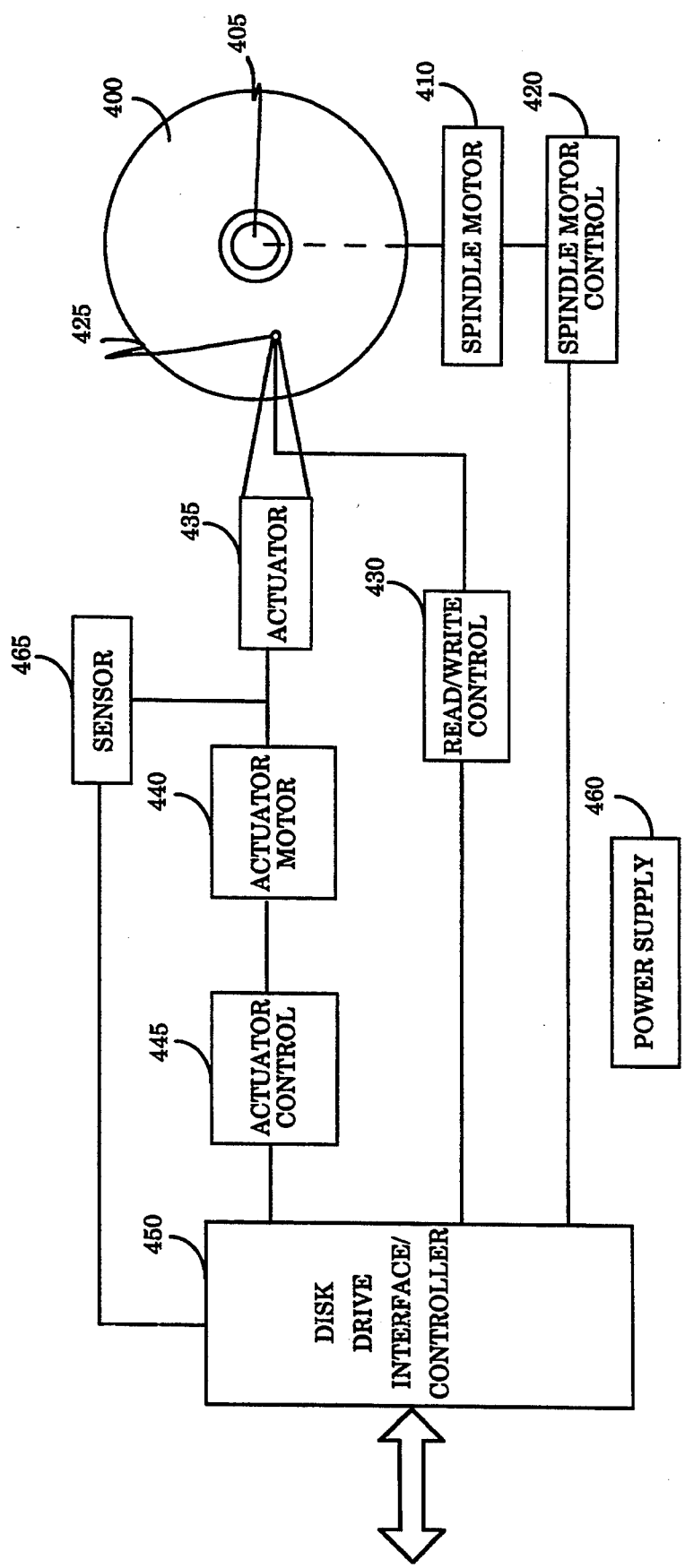
FIG. 4 is a system block diagram of a disk drive system which performs seek operations in accordance with the teachings of the present invention.

One embodiment of a system incorporating the teachings of the present invention is shown in FIG. 4. The disk 400 is rotated about a spindle 405 by spindle motor 410. This is controlled by spindle motor control 420. The read/write head assembly 425 is controlled by read/write control 430; the head assembly 425 is placed at the end of an actuator 435 which selects the track to perform an operation upon the actuator is driven by an actuator motor 440 and is controlled by actuator control 445. All system control, as well as interface to the host system, is performed by disk drive interface controller 450.

In the present embodiment, disk drive interface/controller 450 functions to decrease the spindle current input to the spindle motor by a power supply 460 during accelerate and/or decelerate portions of the seek in order that the differential current can be supplied to the actuator motor 440 to increase the speed during the accelerate/decelerate portions of the seek in order to improve seek performance without requiring the need of a more powerful power supply.

A sensor 465 is provided to sense the current input to the actuator 435. This gives an indication of how fast the actuator is accelerating as the acceleration is proportional to the current input. This gives an indication of the acceleration which helps in determining the location of the actuator on the disk.

During the coast portion of the seek, the disk drive controller interface 450 causes spindle motor control to increase the power of the current to spin the motor 410 to compensate for the decrease in current during the acceleration and/or deceleration phases of the seek. Thus, seeks are performed more quickly but not at the penalty of an increase in the peak power of a power supply. Preferably, a table is generated, referred to as a position scheduler, which provides track identification based on the velocity of the actuator. Velocity is preferably determined simply by multiplying the acceleration by the time. Once the actuator velocity exceeds the velocity of the table, deceleration is begun in order to finally reach the current track.

Figure 5:
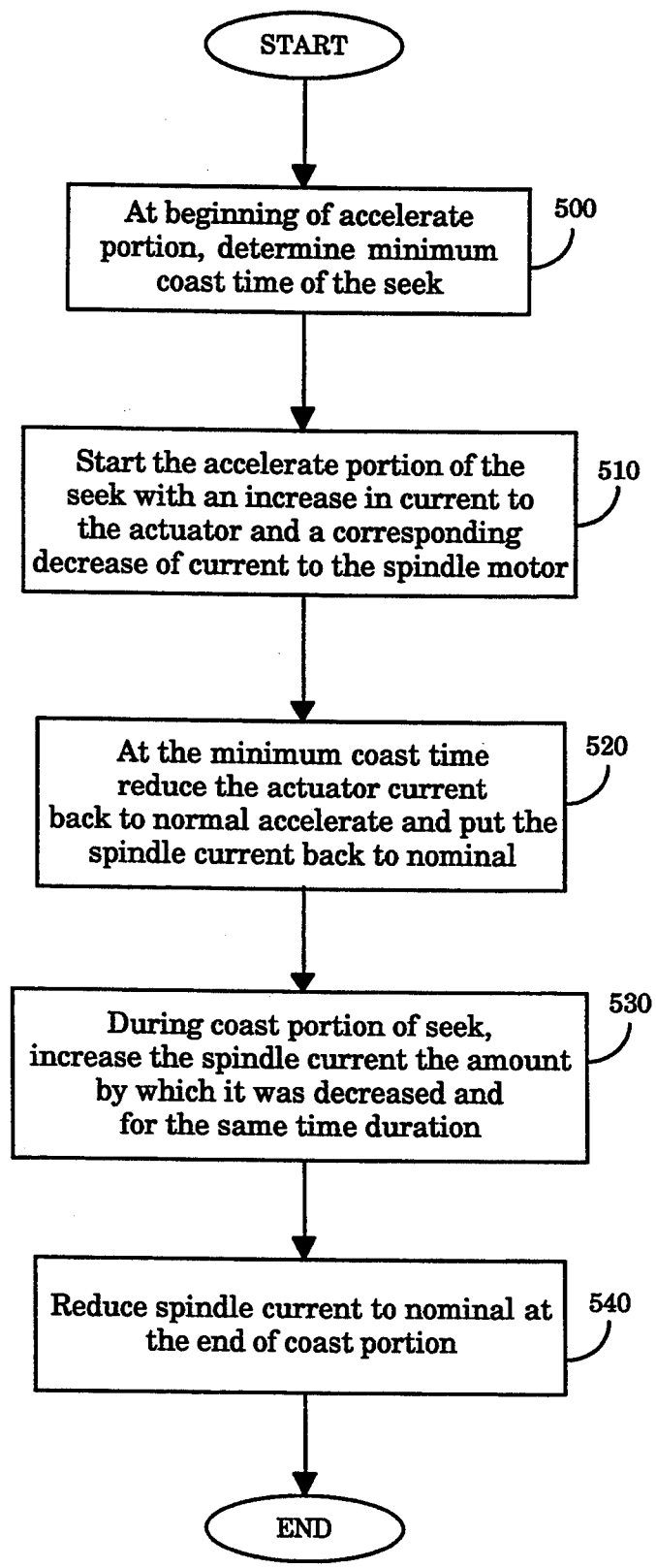
FIG. 5 is a diagram which sets forth exemplary steps performed to improve the seek time in accordance with the teachings of the present invention.

The process for maintaining constant power consumption while improving actuator seek time can be explain with reference to FIG. 5. FIG. 5, sets forth exemplary steps performed to improve the seek time by increasing the power during the acceleration portion of the seek. However, it is readily apparent that similar steps can be performed to increase the power to the actuator motor during the deceleration portion of the seek or during both the acceleration and deceleration portions of the seek.

Referring to FIG. 5, at step 500, at the beginning of the of the acceleration portion of the seek, the minimum coast time of the seek, X, for a given distance the actuator is to travel is determined. The minimum coast time indicates the amount of time available to increase the spindle current in accordance with the teachings of the present invention.

A number of different techniques may be used to determine the minimum coast time. In one method, a table which maps different coast time values against the number of tracks traveled is determined. This is calculated based on anticipated acceleration/deceleration and maximum velocity of the actuator. Thus, for example, the distance traveled during the acceleration phase may be calculated according to a well known formula: distance $=\frac{1}{2}a\,t^2$, where "a" represents the acceleration and "t" represents the amount of time of the acceleration; in the present instance, the amount of time for acceleration up to the maximum velocity of the actuator. A similar calculation is also performed for the deceleration portion of the seek. Based upon the maximum velocity, the number of tracks moved is determined for incremental durations of coast times. For example, the distance traveled during the coast portions of the seek for a duration of time equal to one sector is determined, followed by calculations for 2 sectors, 3 sectors, etc. From these calculations the table is generated. The table generated may contain varying increments between values. For example, the table may contain values for one sector increments during the coast phase or 10 sector increments. Intermediate values not found in the table can be determined, as needed, by interpolation of the closest values found in the table. Thus, for any given seek for a given distance the actuator is to travel, the minimum coast time of the seek is determined by reference to the table. It is readily apparent that different values are generated for different combinations of acceleration, deceleration and maximum velocity values. Furthermore, it is apparent that alternative methods for determining the minimum cost time, such as calculating the minimum coast time for a given distance on an as needed basis, may be used.

At step 510, the acceleration portion of the seek is initiated with an increase in current. In the present example, the current to the actuator motor is increased by an additional 0.1 Amperes over the nominal amount of current utilized in the prior art. The current to the spindle is correspondingly decreased during the acceleration portion by 0.1 Amperes. At time X, the minimum duration of the coast portion of the seek, the current to the actuator is reduced 0.1 Amperes back to its nominal acceleration value, step 520. At Step 530, the spindle current is increased by 0.1 Amperes for a time corresponding to the amount of time 0.1 Amperes was increased to the actuator motor during acceleration and at step 540, the current to the spindle motor is reduced back to its nominal value. It is apparent that the amount and duration of the increase in current to the spindle motor during the coast phase can be varied in order to insure that the amount of current decreased to the spindle motor during the acceleration portion of the seek is replaced during the coast portion of the seek.

The resultant effect is that the seek time is improved without exceeding spindle velocity tolerances or the maximum current of the power supply. If the current is also to be increased to the actuator motor during the deceleration portion of the seek, there are two approaches. In one approach, the spindle current is increased, for example, 0.1 Amperes for a time Y while the accelerate and decelerate portions of the seek are given an extra 0.1 Amperes for a time 0.5Y. Another example is to increase the spindle current during the coast portion by 2*.1 Amperes for a time Y with the accelerate and decelerate portions of the seek increased 0.1 Amperes to the actuator motor for a time Y. In the last example, during the coast portion of the seek, the current to the spindle motor is increased 0.2 Amperes for a time Y, resulting in a total current draw of 0.4 Amperes. It should be verified that it is physically possible to put the extra current back into the spindle motor. If, for example, the maximum current that can be produced in the spindle motor was 0.25 Amperes under worst case condition, then assuming that an extra 0.1 Amperes could be added during the coast portion of the seek to get the spindle back to the nominal speed is not possible. In addition, minimum as well as maximum spindle currents possible under worst case conditions may limit the amount of extra current available for the actuator motor.

The invention has been described in conjunction with the preferred embodiment. It is evident that numerous alternatives, modifications, variations and uses will be apparent to those skilled in the art, in light of the foregoing description.

What is claimed is:

1. A disk drive system comprising:
   a disk rotated by a spindle;
   a spindle motor coupled to the spindle to drive the spindle;
   a head assembly to perform operations on the disk;
   an actuator coupled to the head assembly to position the head assembly on predetermined tracks of the disk, said actuator performing a seek of a track by performing at least two sequences comprising an acceleration to a coast velocity and a deceleration from a coast velocity to locate to a predetermined track;
   an actuator motor coupled to the actuator to drive the actuator;
   a power supply coupled to the spindle motor and actuator motor to supply power to operate the spindle motor and power to operate the actuator motor; and
   a controller to control the amount of power supplied to the actuator motor and the amount of power supplied to the spindle motor, said controller providing approximately constant power to the spindle motor in order for the spindle to rotate at a predetermined spindle velocity, said controller providing increased power to the actuator motor during at least one of the sequences, said controller further decreasing the power to the spindle motor during at least a part of the at least one of the sequences to compensate at least in part for the increase in power used by the actuator and decrease the total power used in the system during the at least one sequence portion, said controller further increasing the power to the spindle during a coast portion of the seek during which the actuator moves at an approximate constant coast velocity and decreasing the increased power to the actuator during the coast portion of the seek, said total power increased to the spindle motor being approximately equal to the total power decreased to the spindle motor during the acceleration portions of the seek;
   wherein the seek performance of the actuator is increase while the peak power consumed is minimized.

2. The disk drive system as set forth in claim 1, wherein the power increased to the spindle motor during the coast portion of the seek is approximately equal to the amount of power decreased to the spindle during the at least one of the sequences, said power increased for a duration of time approximately equal to the duration of time the power is decreased during the at least one of the sequences.

3. The disk drive system as set forth in claim 1, wherein the power increased to the spindle motor during the coast portion of the seek is a factor greater than the amount of power decreased to the spindle during the at least one of the sequences, said power increased for a duration of time that is a factor less than the duration of time the power is increased during the at least one of the sequences.

4. The disk drive system as set forth in claim 1, wherein the power increased to the spindle motor during the coast portion of the seek is a factor less than the amount of power decreased to the spindle motor during the at least one of the sequences, said power increased for a duration of time that is a factor greater than the duration of time the power is decreased to the spindle motor during the at least one of the sequences.

5. The disk drive system as set forth in claim 1, wherein the power increased to the spindle motor during the coast portion of the seek is approximately equal to the amount of power increased to the actuator during the at least one of the acceleration portions of the seek, said power increased for a duration of time approximately equal to the duration of time the power is increased to the actuator during the at least one of the acceleration portions of the seek.

6. The disk drive system as set forth in claim 1, wherein the power increased to the spindle motor during the coast portion of the seek is a factor greater than the amount of power increased to the actuator during the at least one of the sequences, said power increased to the spindle for a duration of time that is a factor less than the duration of time the power is increased to the actuator motor during the at least one of the sequences.

7. The disk drive system as set forth in claim 1, wherein the power increased to the spindle motor during the coast portion of the seek is a factor less than the amount of power decreased to the spindle during the at least one of the sequences, said power increased for a duration of time that is a factor greater than the duration of time the power is increased to the actuator motor during the at least one of the sequences.

8. The disk drive system as set forth in claim 1, wherein the power supplied to the actuator motor and spindle motor is measured in terms of current.

9. The disk drive system as set forth in claim 1, further comprising a sensor means coupled to the output of the actuator motor, said sensor providing a measurement of the current output by the actuator motor.

10. The disk drive system as set forth in claim 9, wherein said current measurement provided by the sensor is utilized to derive a velocity measurement of the actuator.

11. The disk drive system as set forth in claim 1, wherein said coast velocity is the maximum velocity the actuator moves.

12. A disk drive system comprising:
a disk comprising a plurality of tracks and rotated by a spindle means;
a head assembly means to perform operations on the disk;
an actuator means coupled to the head assembly means for positioning the head assembly means on predetermined tracks of the disk, said actuator means performing a seek of a track by performing at least two sequences comprising an acceleration to a coast velocity and a deceleration from a coast velocity to locate the head assembly means at a predetermined track;
a power supply coupled to the spindle means and actuator means to supply power to operate the spindle means and actuator means; and
a controller means for controlling the amount of power supplied to the spindle means and actuator means, said controller means providing approximately constant power to the spindle means to rotate the disk at a predetermined spindle velocity, said controller means providing an increase in power to the actuator means during at least one of the sequences, said controller means further decreasing the power to the spindle means during at least a part of at least one of the sequences, said controller means further increasing the power to the spindle means during a coast portion of the seek during which the actuator means moves at an approximate constant coast velocity, and said controller decreasing the increased power to the actuator during the coast portion of the seek, said total power increased to the spindle means being approximately equal to the amount of total power decreased to the spindle means during the at least one of the sequences;
wherein the seek performance of the actuator means is increased while peak power consumed by the actuator means and spindle means is minimized.

13. In a disk drive system comprising a disk rotated by a spindle, a spindle motor coupled to the spindle to drive the spindle, a head assembly to perform operations on the disk, an actuator coupled to the head assembly to position the head assembly on predetermined tracks of the disk, said actuator performing a seek of a track by performing at least two sequences comprising an acceleration to a coast velocity and a deceleration from a coast velocity to locate the head assembler to a predetermined track, an actuator motor coupled to the actuator to drive the actuator, and a power supply coupled to the spindle motor and actuator motor to supply power to operate the spindle motor and power to operate the actuator motor, a method for increasing the seek performance of the actuator while minimizing peak power consumed, said method comprising the steps of:
increasing the power to the actuator motor during at least a portion of at least one of the sequences;
decreasing the power to the spindle motor during the at least a portion of at least one of the sequences by a corresponding amount; and
increasing the power to the spindle motor during a coast portion of the seek by a proportional amount and duration of time decreased to the spindle motor during the at least a portion of at least one of the sequences and decreasing the increased power to the actuator motor during the coast portion of the seek.

14. The method as set forth in claim 13, wherein the step of increasing the power to the spindle motor during the coast portion of the seek comprises the step of increasing the power by an amount approximately equal to the amount of power decreased to the spindle during the at least one of the sequences, said power increased for a duration of time approximately equal to the duration of time the power is decreased during the at least one of the sequences.

15. The method as set forth in claim 13, wherein the step of increasing the power to the spindle motor during the coast portion of the seek comprises the step of increasing the power by a factor greater than the amount of power decreased to the spindle during the at least one of the sequences, said power increased for a duration of time that is a factor less than the duration of time the power is increased during the at least one of the sequences.

16. The method as set forth in claim 13, wherein the step of increasing the power to the spindle motor during the coast portion of the seek comprises the step of increasing the power by a factor less than the amount of power decreased to the spindle motor during the at least one of the sequences, said power increased for a duration of time that is a factor greater than the duration of time the power is decreased to the spindle motor during the at least one of the sequences.

17. The method as set forth in claim 13, wherein the step of increasing the power to the spindle motor during the coast portion of the seek comprises the step of increasing the power by an amount equal to the amount of power increased to the actuator during the at least one of the sequences, said power increased for a duration of time approximately equal to the duration of time the power is increased to the actuator during the at least one of the sequences.

18. The method as set forth in claim 13, wherein the step of increasing the power to the spindle motor during the coast portion of the seek comprises the step of increasing the power by an amount that is a factor less than the duration of time the power is increased to the actuator motor during the at least one of the sequences.

19. The method as set forth in claim 13, wherein the step of increasing the power to the spindle motor during the coast portion of the seek comprises the step of increasing the power by an amount that is a factor less than the amount of power decreased to the spindle during the at least one of sequences, said power increased for a duration of time that is a factor greater than the duration of time the power is increased to the actuator motor during the at least one of the sequence.

20. The method as set forth in claim 13, further comprising the step of determining the minimum coast time for the seek based upon the distance the actuator is to move the head assembly during the seek.

21. The method as set forth in claim 20, wherein the step of increasing the power to the actuator motor is performed for a duration of time corresponding to the minimum coast time.

22. The method as set forth in claim 20, wherein the step of increasing power to the spindle motor is performed for a duration of time corresponding to the minimum coast time.

* * * * *